United States Patent
Mori

(10) Patent No.: US 10,421,249 B2
(45) Date of Patent: Sep. 24, 2019

(54) SOUND PROOF MATERIAL AND METHOD FOR MANUFACTURING THE SOUND PROOF COVER

(71) Applicant: NICHIAS CORPORATION, Tokyo (JP)

(72) Inventor: Tadashi Mori, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 76 days.

(21) Appl. No.: 15/321,921

(22) PCT Filed: Jun. 23, 2015

(86) PCT No.: PCT/JP2015/003127
§ 371 (c)(1),
(2) Date: Dec. 23, 2016

(87) PCT Pub. No.: WO2015/198586
PCT Pub. Date: Dec. 30, 2015

(65) Prior Publication Data
US 2017/0129204 A1    May 11, 2017

(30) Foreign Application Priority Data
Jun. 24, 2014   (JP) ................. 2014-129406

(51) Int. Cl.
*B32B 5/02* (2006.01)
*B32B 27/12* (2006.01)
(Continued)

(52) U.S. Cl.
CPC .............. *B32B 5/024* (2013.01); *B32B 27/12* (2013.01); *B32B 27/34* (2013.01); *B32B 37/06* (2013.01);
(Continued)

(58) Field of Classification Search
CPC .......... B32B 5/024; B32B 27/12; B32B 27/34; B32B 37/16; B32B 37/10; B32B 2250/03;
(Continued)

(56) References Cited

U.S. PATENT DOCUMENTS

| 5,632,844 A | 5/1997 | Pate et al. |
| 2004/0055813 A1 | 3/2004 | Tsuiki et al. |

(Continued)

FOREIGN PATENT DOCUMENTS

| CA | 2136773 | 5/1995 |
| DE | 44 42 014 | 6/1995 |

(Continued)

OTHER PUBLICATIONS

International Search Report issued in PCT/JP2015/003127 dated Aug. 11, 2015.
(Continued)

*Primary Examiner* — Forrest M Phillips
(74) *Attorney, Agent, or Firm* — Nixon & Vanderhye P.C.

(57) ABSTRACT

A sound proof material here disclosed comprises an exterior material layer 8 including a holding material 3 made of a woven fabric and a skin material 2 made of a thermoplastic resin film, and a sound absorbing material layer 9, the exterior material layer 8 being laminated on the sound absorbing material layer 9 so that the skin material 2 is located on the surface side of the sound proof material, whereby the sound proof material can endure long-time use without deterioration in moldability under inhibition of aging in severe operating environments so that the sound proof material can be suitably used while suppressing sound from a sound source around an engine installed in an engine compartment of an automobile.

6 Claims, 2 Drawing Sheets

(51) Int. Cl.

| | | |
|---|---|---|
| *B60R 13/08* | (2006.01) | |
| *F02B 77/13* | (2006.01) | |
| *B32B 27/34* | (2006.01) | |
| *B32B 37/06* | (2006.01) | |
| *B32B 37/10* | (2006.01) | |
| *B32B 37/16* | (2006.01) | |
| *G10K 11/168* | (2006.01) | |

(52) U.S. Cl.
CPC .............. *B32B 37/10* (2013.01); *B32B 37/16* (2013.01); *B60R 13/08* (2013.01); *B60R 13/0884* (2013.01); *F02B 77/13* (2013.01); *G10K 11/168* (2013.01); *B32B 2250/03* (2013.01); *B32B 2262/0253* (2013.01); *B32B 2262/0261* (2013.01); *B32B 2262/0276* (2013.01); *B32B 2305/188* (2013.01); *B32B 2307/102* (2013.01); *B32B 2307/51* (2013.01); *B32B 2323/10* (2013.01); *B32B 2367/00* (2013.01); *B32B 2377/00* (2013.01); *B32B 2605/00* (2013.01); *B60R 13/0838* (2013.01)

(58) Field of Classification Search
CPC .... B32B 2262/0253; B32B 2262/0261; B32B 2262/0276; B32B 2305/188; B32B 2307/102; B32B 2307/51; B32B 2323/10; B32B 2367/00; B32B 2377/00; B32B 2605/00; G10K 11/168
USPC ......................................... 181/290, 292, 284
See application file for complete search history.

(56) References Cited

U.S. PATENT DOCUMENTS

| | | | |
|---|---|---|---|
| 2004/0091615 A1 | 5/2004 | Bopp | |
| 2009/0255755 A1* | 10/2009 | Matsuyama | .......... B60R 13/083 181/290 |
| 2010/0101891 A1* | 4/2010 | Kamikawa | .............. B32B 15/14 181/290 |
| 2011/0067949 A1 | 3/2011 | Mori et al. | |
| 2011/0108359 A1* | 5/2011 | Nishimura | ............ G10K 11/168 181/290 |
| 2012/0156006 A1* | 6/2012 | Murray | .................... F02C 7/045 415/119 |
| 2012/0234626 A1* | 9/2012 | Ishikawa | ................. B32B 38/12 181/290 |
| 2014/0008144 A1* | 1/2014 | Savian | .................... B64C 1/066 181/290 |
| 2014/0326536 A1* | 11/2014 | Vauchel | ............... G10K 11/168 181/290 |
| 2015/0315972 A1* | 11/2015 | Lumbab | .................. B32B 37/12 415/119 |
| 2016/0012811 A1* | 1/2016 | Yamagiwa | ............. B60N 3/048 181/290 |
| 2016/0059799 A1* | 3/2016 | Kim | ...................... G10K 11/168 296/39.3 |
| 2016/0312389 A1* | 10/2016 | Jang | ........................ B32B 5/024 |

FOREIGN PATENT DOCUMENTS

| | | |
|---|---|---|
| EP | 1 547 761 | 6/2005 |
| EP | 1 975 007 | 10/2008 |
| EP | 2 302 620 | 3/2011 |
| JP | 7-232398 | 9/1995 |
| JP | 9-254314 | 9/1997 |
| JP | 2000-158575 | 6/2000 |
| JP | 2003-216158 | 7/2003 |
| JP | 2007-111866 | 5/2007 |
| JP | 2011-64167 | 3/2011 |
| WO | WO 03/095267 | 11/2003 |
| WO | WO 2008/121238 | 10/2008 |

OTHER PUBLICATIONS

International Preliminary Report on Patentability issued in PCT/JP2015/003127 dated Dec. 27, 2016.

Extended European Search Resort issued in Appln. No. 15811085.8 dated Jan. 15, 2018.

Japanese Office Action issued in Appln. No. 2014-129406 dated Mar. 27, 2018 (with machine translation).

* cited by examiner (a)

(b)

SOUND PROOF MATERIAL AND METHOD FOR MANUFACTURING THE SOUND PROOF COVER

This application is the U.S. national phase of International Application No. PCT/JP2015/003127 filed Jun. 23, 2015 which designated the U.S. and claims priority to JP Patent Application No. 2014-129406 filed Jun. 24, 2014, the entire contents of each of which are hereby incorporated by reference.

TECHNICAL FIELD

The present invention relates to a sound proof material and a method for manufacturing a sound proof cover. More particularly, it relates to a sound proof material suitable for reducing noise generated from an engine and its periphery of an automobile and a method for manufacturing a sound proof cover in which such a sound proof material is used.

BACKGROUND ART

Heretofore, to reduce noise from an engine of an automobile and others which are noise generation sources, various sound proof materials have been suggested. For example, the present applicant has suggested a sound proof cover which comprises a sound absorbing material arranged so as to face sound sources, an air-impermeable soft sound insulating layer laminated on the sound absorbing material, and a soft cover which forms an air layer between the soft cover and the soft sound insulating layer, whereby, in the sound proof cover, the air layer is hermetically sealed (see Patent Document 1).

CITATION LIST

Patent Literature

Patent Literature 1: JP-A-2011-64167

SUMMARY OF INVENTION

Problem to be Solved by the Invention

Meanwhile, in Economic Commission for Europe (ECE) of the United Nations, harmonization of regulations concerning vehicle noise has been investigated in World Forum for Harmonization of Vehicle Regulations. In the forum, rules concerning vehicle structures are made or revised, and as to the noise of automobiles, regulation values of vehicle exterior noise are set up in Rule 51 (ECE R51), and this regulation value is getting more rigorous every time the rules are revised.

The sound proof cover suggested in Patent Literature 1 by the present applicant is also subject to such revision of the rules, but to fulfill the demand which has become more severe for reduction in the vehicle exterior noise in the current situation, the sound proof measure must be taken also to a sound source around an engine that sound proof measure has not been taken previously, e.g., an oil pan, for example.

However, to take the sound proof measure to the sound source installed below an engine compartment like an oil pan, durability against cooling water (LLC), a battery liquid, a window washer liquid and others treated in the engine compartment is required for the sound proof material used in this measure, and deterioration of the material must be avoided even if these liquids spill over and stick.

Further, in the engine compartment, the sound proof material is exposed to not only heat from the engine but also mists of oils such as an engine oil, an AT fluid and a power steering oil, and hence, heat resistance and oil resistance against them are also required. Furthermore, an undercover is disposed to lower parts of the engine compartment, but generally the oil pan is not covered with the undercover, and is therefore often disposed in a state of exposure to the outside. Thus, durability against external environments of wind and water or fly rocks is also required.

As described above, it is desirable that the sound proof material used in the sound proof measure for the sound sources around the engine installed in the engine compartment has high durability in severe operating environments and is able to suppress aging deterioration and endure long-term use. In addition, at the time of molding the sound proof material into a predetermined shape corresponding to a shape of the sound source such as an oil pan, it is also necessary that moldability of the sound proof material is not impaired.

In view of the above-described problem, the present invention has been developed. It is an object of the present invention to provide a sound proof material which can be suitably used in a sound proof measure for, e.g., a sound source around engine installed in an engine compartment of an automobile, the sound proof material being also able to endure long-term use while suppressing aging deterioration even in severe operating environments without impairing moldability of the sound proof material, and a method for manufacturing a sound proof cover using such a sound proof material.

Means for Solving Problem

A sound proof material according to the present invention comprises a sound absorbing material layer arranged to face a sound source and an exterior material layer laminated on the sound absorbing material layer, wherein the exterior material layer comprises a holding material made of a woven fabric and a skin material made of a thermoplastic resin film, and is laminated on the sound absorbing material layer so that the skin material is placed on a surface side.

Moreover, a method for manufacturing a sound proof cover according to the present invention is a method for hot-press-forming the above-described sound proof material into a predetermined shape.

Effect of the Invention

According to the present invention, it is possible to provide the sound proof material which can endure long-term use while suppressing aging deterioration even in severe operating environments without impairing moldability of the sound proof material, and a method for manufacturing a sound proof cover using such a sound proof material.

MODE FOR CARRYING OUT THE INVENTION

Hereinafter, an embodiment of a sound proof material according to the present invention will be described with reference to the drawings.

Figure 1:
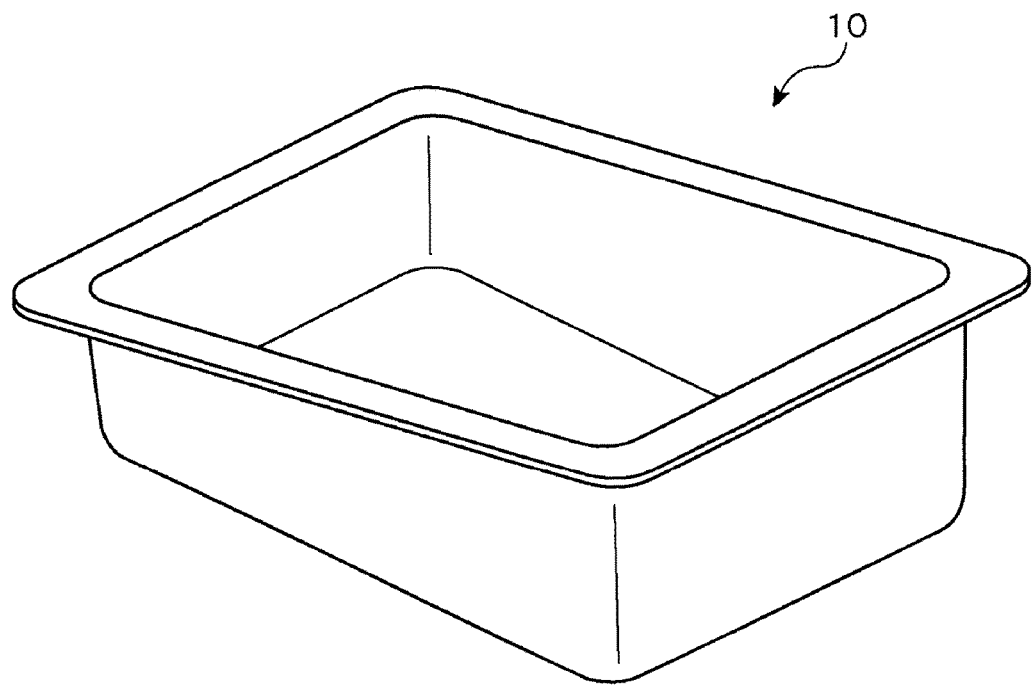
FIG. 1 is a perspective view showing an outline of a sound proof cover provided by hot-press-forming a sound proof material according to an embodiment of the present invention.
Figure 2:
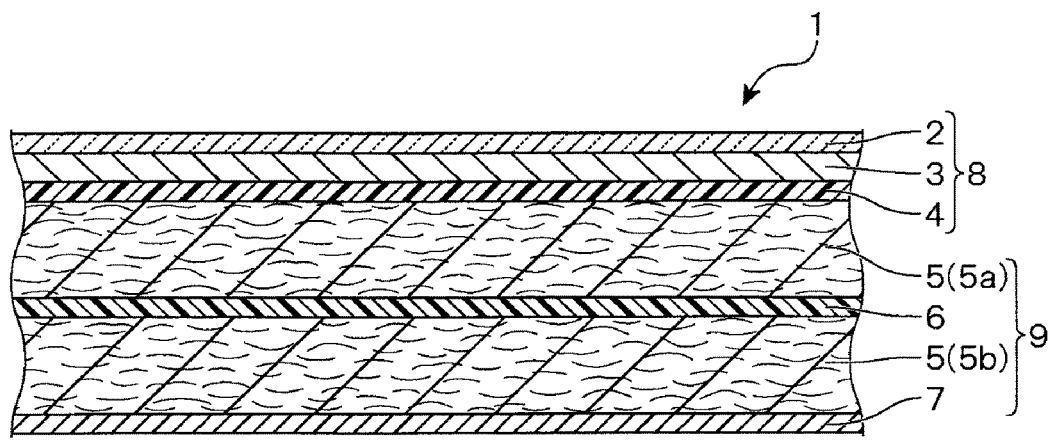
FIG. 2 is an enlarged cross-sectional view of a primary part of the sound proof material according to the embodiment of the present invention.

It is to be noted that FIG. 1 is a perspective view showing an outline of a sound proof cover provided by hot-press-forming the sound proof material according to this embodiment, and FIG. 2 is an enlarged cross-sectional view of a primary part of the sound proof material according to this embodiment.

A sound proof material 1 in this embodiment can be laid on a sound source around an engine installed in an engine compartment of an automobile and preferably used for a sound proof measure, and it is hot-press-formed into a predetermined shape so as to cover a sound source such as an oil pan as shown in, e.g., FIG. 1 and disposed to a laying region as a sound proof cover 10.

As shown in FIG. 2, the sound proof material 1 includes a sound absorbing material layer 9 arranged to face the sound source and an exterior material layer 8 laminated on the sound absorbing material layer, and the exterior material layer 8 includes a holding material 3 made of a woven fabric and a skin material 2 made of a thermoplastic resin film and is laminated on the sound absorbing material layer 9 so that the skin material 2 is placed on a surface side.

It is to be noted that FIG. 2 shows a cross section of the sound proof material 1 on the assumption that the sound source is placed on a lower side in the drawing.

As the thermoplastic resin film forming the skin material 2, it is possible to use, e.g., a polyamide-based resin film, a polyester-based resin film, a polyolefin-based resin film, a flexible vinyl chloride-based resin film, polyvinyl alcohol-based resin film, a polycarbonate-based resin film, a polystyrene-based resin film, a polyacrylonitrile-based resin film, an ethylene-vinyl acetate copolymer-based resin film, or the like, and using the polyamide-based resin film superior in toughness, shock resistance, and flexibility to the other materials is preferable. Each of these thermoplastic resin films may be either a stretched film or a non-stretched film, but considering moldability at the time of hot-press-forming the sound proof material 1 into a predetermined shape, the non-stretched film is preferable. To improve the moldability of the sound proof material 1 by using the non-stretched film as the thermoplastic resin film forming the skin material 2, it is preferable for the non-stretched film to be stretchable with a stretch ratio of 5 to 500%, or more preferably 10 to 500%, or further more preferably 20 to 200%.

It is to be noted that the stretch ratio of the non-stretched film is a stretch ratio of the film when a tensile test is conducted in conformity to JIS K7161, a strip-like test piece having a width of 25 mm and a length of 150 mm is stretched at a velocity of 100 mm/minute, and a load reaches 10N.

As the woven fabric forming the holding material 3, it is possible to use a woven fabric provided by weaving, e.g., polyolefin-based resin fibers such as polypropylene-based resin fibers or thermoplastic resin fibers such as polyester-based resin fibers, polyamide-based resin fibers, a flexible vinyl chloride-based resin fibers, polycarbonate-based resin fibers, or polyacrylonitrile-based resin fibers and, considering moldability at the time of hot-press-forming the sound proof material 1 into a predetermined shape or shape retaining properties after the molding, using a woven fabric provided by weaving at least one selected from the polypropylene-based resin fibers, the polyester-based resin fibers, and the polyamide-based resin fibers is preferable. Each of these woven fabrics may be a woven fabric provided by plain weaving, twill weaving or the like, but considering the moldability at the time of hot-press-forming the sound proof material 1 into a predetermined shape, a stretch woven fabric provided by 2-way tricot weaving is preferable.

The exterior material layer 8 is formed by laminating the skin material 2 and the holding material 3 described above, but an adhesive may be interposed as required at the time of laminating the skin material 2 and the holding material 3. Additionally, to bond and laminate the exterior material layer 8 to the sound absorbing material layer 9, the exterior material layer 8 may have a laminated constitution which includes, e.g., a polyurethane elastomer film, a polyolefin blend-based elastomer film, a polyolefin copolymer-based elastomer film, a polystyrene copolymer-based elastomer film, or a polyester copolymer-based elastomer film as a bonding layer 4 on the back side of the holding material 3 facing the sound absorbing material layer 9.

In the exterior material layer 8 having such a laminated constitution, at the time of hot-press-forming the sound proof material 1, fibers of the woven fabric forming the holding material 3 are molten, and they are cooled and solidified in a state where a predetermined shape is provided after molding so that the fibers are secured to each other, whereby rigidity is enhanced and the shape after molding is excellently maintained.

As described above, the sound proof material 1 in this embodiment has flexibility and excellent moldability before the hot press forming, and its rigidity is enhanced after the hot press forming, which results in good shape retention. To improve the moldability of the sound proof material 1 and the shape retention after the molding, the exterior material layer 8 preferably has a Young's modulus of 0.005 to 0.5 GPa or more preferably 0.05 to 0.3 GPa before the hot press forming, and has the Young's modulus of 0.6 to 5.0 GPa or more preferably 1.0 to 3.0 GPa after the hot press forming.

It is to be noted that the Young's modulus is a value measured in conformity to JIS K7127.

Further, the sound absorbing material layer 9 on which the above-described exterior material layer 8 is laminated includes a sound absorbing material 5, using artificial mineral fibers such as glass wool or rock wool as the sound absorbing material 5 is preferable, and its weight per area of 100 to 5000 g/m$^2$ is desirable. Besides, for example, it is possible to use, as the sound absorbing material 5, felts such as a polyester fiber felt of polyethylene terephthalate or the like, a nylon fiber felt, a polyethylene fiber felt, a polypropylene fiber felt, an acrylic fiber felt, a silica alumina ceramic fiber felt, a silica fiber felt, or a resin felt provided by processing cotton, sheep wool, wood wool, or waste fibers into a felt-like form with the use of a thermoplastic resin, polyurethane foam, polyethylene foam, polypropylene foam, phenol foam, melamine foam, or a porous material such as open-cell foam provided by foaming nitrile-butadiene rubber, chloroprene rubber, styrene rubber, silicone rubber, urethane rubber, or ethylene propylene diene rubber into open-cell shapes or formed into open cells by crushing processing after foaming.

In this embodiment, to enhance sound proof performance of the sound proof material 1, two sound absorbing materials 5a and 5b which are the same type or different types are laminated through a soft sound insulating layer 6. Further, on a side of the sound absorbing material layer 9 which corresponds to the sound source, a lining material 7 made of a nonwoven fabric or a thermoplastic resin film is laminated in terms of prevention of scattering of fibers forming the sound absorbing material 5b or of appearance of a product. That is, the sound absorbing material layer 9 has a laminated constitution in which the first sound absorbing material 5a, the soft sound insulating material 6, the second sound absorbing material 5b, and the lining material 7 are provided in the mentioned order on the side where the exterior material layer 8 is laminated.

Here, it is feared that if rain water or the like penetrates into the sound proof cover 10 disposed to the laying region, the sound absorbing materials 5a and 5b absorbing moisture deteriorate, the sound absorbing performance is impaired, and mold grow. However, when the thermoplastic resin film is used for the lining material 7, such inconveniences can be prevented. In case of using the thermoplastic resin film as the lining material 7, the same thermoplastic resin film as the skin material 2 can be used as such a thermoplastic resin film.

In the sound absorbing material layer 9 having such a laminated constitution, the soft sound insulating material 6 is laminated so that the sound insulating material 6 itself deforms to attenuate vibration of sound which has been transmitted through the second sound absorbing material 5b. To realize this, the soft sound insulating material 6 is made of a soft material so that it can deform based on the vibration of the sound, and its Young's modulus is preferably 0.001 to 0.5 GPa or more preferably 0.02 to 0.1 GPa.

Furthermore, it is preferable for the Young's modulus of the soft sound insulating material 6 to be ⅕ or less of the Young's modulus of the exterior material layer 8 after the hot press forming or more preferably ⅒ or less. With this setting, when the sound proof cover 10 provided by hot-press-forming the sound proof material 1 is laid on the sound source, sound waves transmitted through the second sound absorbing material 5b are consumed and sound insulating properties are enhanced by selectively vibrating and deforming the soft sound insulating material 6, the sound waves attenuated by the soft sound insulating material 6 are absorbed by the first sound absorbing material 5a, and the sound is further insulated by the exterior material layer 8, whereby the sound proof performance of the sound proof cover 10 can be further improved.

Furthermore, to enhance the sound insulating properties, the soft sound insulating material 6 preferably has permeability of 10 cc/cm²·sec or less, more preferably 0.001 to 10 cc/cm²·sec, or particularly preferably 0.01 to 1 cc/cm²·sec.

It is to be noted that the permeability is a value measured in conformity with JIS L1018.

As such a soft sound insulating material 6, for example, a resin film or the like can be used, the soft sound insulating material 6 is not restricted in particular as long as it has a predetermined Young's modulus and permeability.

As described above, the sound proof material 1 according to this embodiment includes the sound absorbing material layer arranged to face the sound source and the exterior material layer laminated on the sound absorbing material layer, the exterior material layer includes the holding material made of the woven fabric and the skin material made of the thermoplastic resin film and is laminated on the sound absorbing material layer so that the skin material is placed on the surface side, and the flexibility is provided and the moldability is excellent before the hot press forming, and the rigidity is enhanced to improve the shape retention after the hot press forming as described above.

Moreover, laminating such an exterior material layer on the sound absorbing material layer so that the skin material is placed on the surface side enables enhancing durability against cooling water (LLC), a battery liquid, a window washer liquid, or the like treated in the engine compartment, heat resistance against heat from the engine, oil resistance against oils, and durability against external environments such as wind and water or fly rocks. Consequently, it is possible to provide the sound proof material 1 which can endure long-term use while suppressing aging deteriorating even in severe operating environments.

EXAMPLES

The present invention will now be described hereinafter in more detail with reference to specific examples.

Example 1

A woven fabric which is provided by plain-weaving polypropylene-based resin fibers and has a weight per area of 200 g/m² (manufactured by Ube Exymo Co. Ltd., SIMTEX cloth) was used as a holding material, a non-stretched polyamide-based resin/polyolefin-based resin co-extrusion laminated film (manufactured by Ube Film Company Co.: 35N-L) having a thickness of 55 μm was used as a skin material, a polyurethane elastomer film (manufactured by Sheedom Co. Ltd.: DUS-235) having a thickness of 30 μm was used as a bonding layer, and these members are laminated in a laminated constitution of the non-stretched co-extrusion laminated film (the polyamide-based resin on the surface side/the polyolefin-based resin on the inner surface side)/the woven cloth/the bonding layer, thereby forming an external material layer. A Young's modulus of the thus formed exterior material layer was measured, and a result was 0.2 GPa.

On the other hand, a polyethylene terephthalate short fiber felt (manufactured by Takayasu Co., Ltd.: 5500-HSGYN) having a weight per area of 500 g/m² was used as a first sound absorbing material, a polyolefin-based resin/polyamide-based resin/polyolefin-based resin co-extrusion laminated film (manufactured by Ube Film Company Co.: 35N-LL) having a thickness of 70 μm was used as a soft insulating layer, a polyethylene terephthalate short fiber felt (manufactured by Takayasu Co., Ltd.: 5500-HSGYN) having a weight per area of 500 g/m² was used as a second sound absorbing material, a non-woven fabric (manufactured by Maeda Kosen Co., Ltd.: 125H/PUR) having a weight per area of 125 g/m² was used as a lining material, and these members are laminated in a laminated constitution of the first sound absorbing material/the co-extrusion laminated film (the polyolefin-based resin/the polyamide-based resin/the polyolefin-based resin)/the second sound absorbing material/the non-woven fabric, thereby forming a sound absorbing material layer.

Further, a sound proof material was fabricated by laminating the exterior material layer on the sound absorbing material layer so that the skin material is placed on the surface side, and the thus fabricated sound proof material was subjected to the hot press forming at 175° C., thus providing a test molding. The exterior material layer was sliced out from the test molding, its Young's modulus was measured, and a result was 3.0 GPa.

Furthermore, water resistance, heat resistance, ice peeling properties, smoothness, moldability, and sound insulating performance of the test molding were evaluated. Evaluation criteria are as follows, and Table 1 shows results of the evaluation.

[Water Resistance]

The evaluation was made on the basis of presence/absence of penetration of water from the skin material to the inside when water was jetted from a nozzle with a pump pressure of 7 MPa so that impact of 3 N can be applied to a surface of the test molding, a circle mark was given to a test molding in which the penetration of water was not confirmed, whereas a cross mark was given to a test molding in which the penetration of water was confirmed.

[Heat Resistance]

Each test molding was put in a Geer oven (a heat degradation testing machine) and left at a set temperature of 100° C. for 144 hours (one week), and then a circle mark was given to each test molding which was not considerably deformed or had no harmful damage such as a tear, a wrinkle, detachment, or a crack on its appearance, whereas a cross mark was given to each test molding which was deformed or had such damage.

[Ice Peeling Properties]

A cylindrical resin cup was mounted on a surface of each test molding, water was poured into it and got frozen, then the resin cup was removed, and a frozen and secured ice pillar was formed on the surface of each test molding. The ice pillar was torn off from the surface of the test molding, a circle mark was given to each test molding which had no harmful damage such as a tear or detachment on the surface thereof, and a cross mark was given to each test molding which had such damage thereon.

[Smoothness]

A friction test conforming to JIS K7125 (1999) was conducted to a flatter portion of each test molding, and a circle mark was given to each test molding having a dynamic friction coefficient of 0.3 or less, whereas a cross mark was given to each test molding having a dynamic friction coefficient exceeding 0.3.

[Moldability]

A circle mark was given to each test molding which had no harmful damage such as a tear, a wrinkle, detachment, or a crack on a surface thereof and had a difference between a mold inner diameter dimension used in molding and a test molding external dimension being 2.5 mm or less, whereas a cross mark was given to each test molding having the same dimension difference exceeding 2.5 mm.

Figure 3:
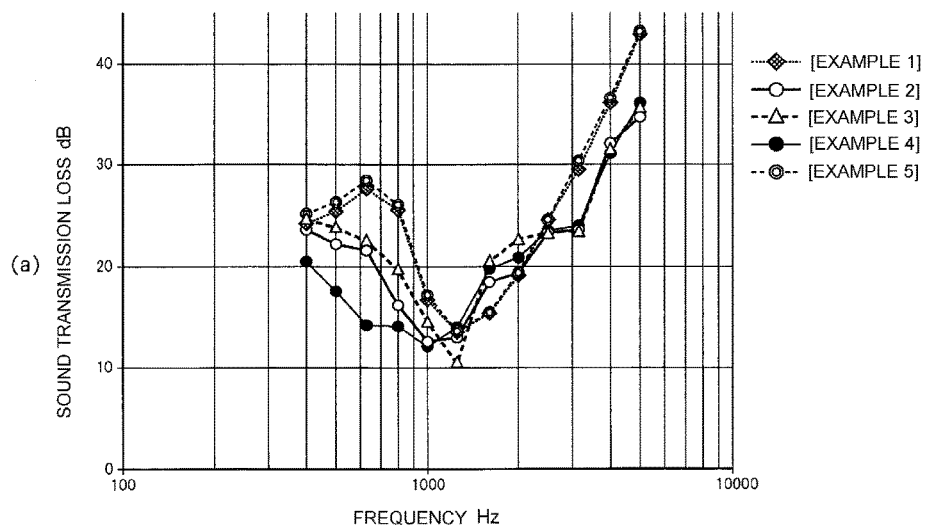
FIG. 3 is graphs showing results of measuring a sound transmission loss in each of examples and comparative examples.
Figure 3:
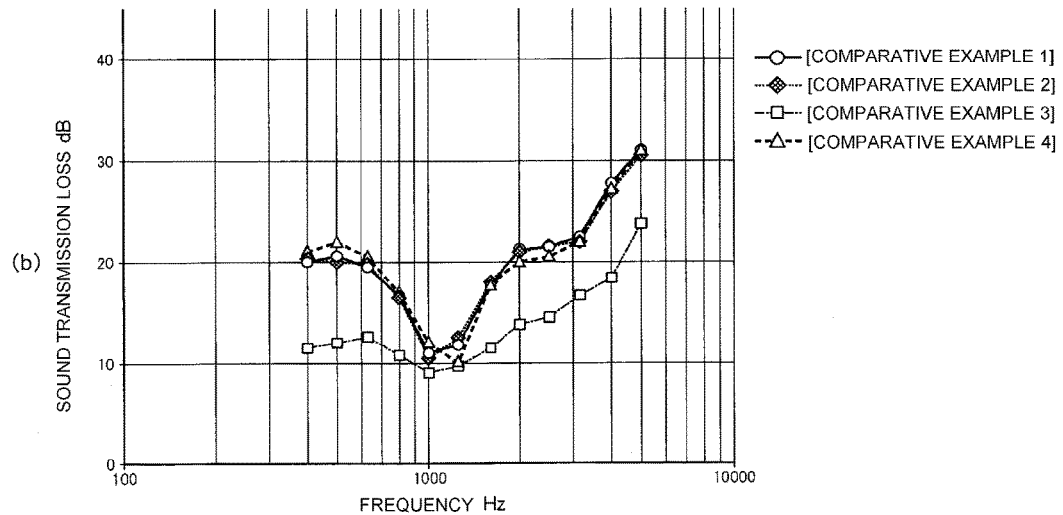

[Sound Insulating Properties] A sound transmission loss of each test molding was measured based on a small reverberation box (a diffuse sound field)/anechoic chamber (a free sound field)/acoustic intensity method. FIG. 3 shows results of this measurement. A double circle mark was given to each test molding having the sound transmission loss of 36 dB or more at 5 kHz, a circle mark was given to each test molding having the same which is less than 36 dB and 33 dB or more, a triangle mark was given to each test molding having the same which is less than 33 dB and 30 dB or more, and a cross mark was given to each test molding having the same which is less than 30 dB.

It is to be noted that FIG. 3(a) shows measurement results of examples and FIG. 3(b) shows measurement results of comparative examples.

TABLE 1

|  | Example 1 | Example 2 | Example 3 | Example 4 | Example 5 |
|---|---|---|---|---|---|
| Water resistance | ○ | ○ | ○ | ○ | ○ |
| Heat resistance | ○ | ○ | ○ | ○ | ○ |
| Ice peeling properties | ○ | ○ | ○ | ○ | ○ |
| Smoothness | ○ | ○ | ○ | ○ | ○ |
| Moldability | ○ | ○ | ○ | ○ | ○ |
| Sound insulating performance | ◎ | ◎ | ○ | ○ | ◎ |

Sound Insulating Performance

Example 2

An exterior material layer was formed in the same manner as Example 1 except that a woven fabric which was provided by performing 2-way tricot weaving to polyester-based resin fibers and had a weight per area of 140 g/m$^2$ (manufactured by Asahi Kasei Intertextiles Corporation: KARI140) was used as a holding material. A Young's modulus of this exterior material layer was measured, and a result was 0.15 GPa.

Further, the exterior material layer was laminated on a sound absorbing material layer formed in the same manner as Example 1 to fabricate a sound proof material, and the thus fabricated sound proof material was subjected to the hot press forming at 175° C., thereby providing a test molding. The exterior material layer was sliced out from the test molding, its Young's modulus was measured, and a result was 2.0 GPa.

Moreover, Table 1 shows results of evaluating each test molding in the same manner as Example 1.

Example 3

An exterior material layer was formed in the same manner as Example 1 except that a woven fabric which was provided by performing 2-way tricot weaving to polyamide-based resin fibers and had a weight per area of 40 g/m$^2$ (manufactured by Asahi Kasei Intertextiles Corporation: AG1529) was used as a holding material. A Young's modulus of this exterior material layer was measured, and a result was 0.1 GPa.

Furthermore, the exterior material layer was laminated on a sound absorbing material layer formed in the same manner as Example 1 to fabricate a sound proof material, and the thus fabricated sound proof material was subjected to the hot press forming at 175° C., thereby providing a test molding. The exterior material layer was sliced out from the test molding, its Young's modulus was measured, and a result was 1.5 GPa.

Moreover, Table 1 shows results of evaluating each test molding in the same manner as Example 1.

Example 4

An exterior material layer was formed in the same manner as Example 1 except that a woven fabric which was provided by performing 2-way tricot weaving to polyester-based resin fibers and had a weight per area of 70 g/m$^2$ (manufactured by Asahi Kasei Intertextiles Corporation: 1430) was used as a holding material. A Young's modulus of this exterior material layer was measured, and a result was 0.1 GPa.

Additionally, the exterior material layer was laminated on a sound absorbing material layer formed in the same manner as Example 1 to fabricate a sound proof material, and the thus fabricated sound proof material was subjected to the hot press forming at 175° C., thereby providing a test molding. The exterior material layer was sliced out from the test molding, its Young's modulus was measured, and a result was 1.0 GPa.

Moreover, Table 1 shows results of evaluating each test molding in the same manner as Example 1.

Example 5

A sound absorbing material was fabricated in the same manner as Example 1 except that a non-stretched polyamide-based resin/polyolefin-based resin co-extrusion laminated film (manufactured by Ube Film Company Co.: 35N-L) was used as a lining material, lamination was performed in a laminated constitution of a first sound absorbing material/the co-extrusion laminated film (the polyolefin-based resin/the polyamide-based resin/the polyolefin-based resin)/a second sound absorbing material/the non-stretched co-extrusion laminated film (the polyolefin-based resin/the polyamide-based resin) to form the sound absorbing material layer, and the thus-fabricated sound absorbing material was subjected to the hot press forming at 175° C., thereby providing a test molding. An exterior material layer was sliced out from the test molding, its Young's modulus was measured, and a result was 3.00 GPa.

Further, Table 1 shows results of evaluating each test molding in the same manner as Example 1.

Comparative Example 1

An exterior material layer was formed in the same manner as Example 1 except that a water-repellent and oil-repellent treated nonwoven fabric having a weight per area of 125 g/m² (manufactured by Maeda Kosen Co., Ltd.: 125H) was used as a holding material. A Young's modulus of this exterior material layer was measured, and a result was 0.25 GPa.

Furthermore, the exterior material layer was laminated on a sound absorbing material layer formed in the same manner as Example 1 to fabricate a sound proof material, and the thus fabricated sound proof material was subjected to the hot press forming at 175° C., thereby providing a test molding. The exterior material layer was sliced out from the test molding, its Young's modulus was measured, and a result was 0.5 GPa.

Moreover, Table 2 shows results of evaluating each test molding in the same manner as Example 1.

Comparative Example 2

A polyurethane elastomer film (manufactured by Sheedom Co. Ltd.: DUS-235) having a thickness of 30 μm was laminated as a bonding layer on a back side of a water-repellent and oil-repellent treated nonwoven fabric having a weight per area of 125 g/m² (manufactured by Maeda Kosen Co., Ltd.: 125H) to form an exterior material layer. A Young's modulus of this exterior material layer was measured, and a result was 0.25 GPa.

Additionally, the exterior material layer was laminated on a sound absorbing material layer formed in the same manner as Example 1 to fabricate a sound proof material, and the thus fabricated sound proof material was subjected to the hot press forming at 175° C., thereby providing a test molding. The exterior material layer was sliced out from the test molding, its Young's modulus was measured, and a result was 0.5 GPa.

Moreover, Table 2 shows results of evaluating each test molding in the same manner as Example 1.

Comparative Example 3

A polyurethane elastomer film (manufactured by Sheedom Co. Ltd.: DUS-235) having a thickness of 30 μm was laminated as a bonding layer on a back side of a non-stretched polyamide-based resin/polyolefin-based resin co-extrusion laminated film (manufactured by Ube Film Company Co.: 35N-L) having a thickness of 55 μm to form an exterior material layer. A Young's modulus of this exterior material layer was measured, and a result was 0.1 GPa.

Further, the exterior material layer was laminated on a sound absorbing material layer formed in the same manner as Example 1 to fabricate a sound proof material, and the thus fabricated sound proof material was subjected to the hot press forming at 175° C., thereby providing a test molding. The exterior material layer was sliced out from the test molding, its Young's modulus was measured, and a result was 0.25 GPa.

Furthermore, Table 2 shows results of evaluating each test molding in the same manner as Example 1.

Comparative Example 4

Water resistance, heat resistance, ice peeling properties, smoothness, moldability, and sound insulating performance of the sound proof material created in Example 1 were evaluated without performing the hot press forming. Table 2 shows results of the evaluation.

TABLE 2

|  | Comp. Ex. 1 | Comp. Ex. 2 | Comp. Ex. 3 | Comp. Ex. 4 |
|---|---|---|---|---|
| Water resistance | ◯ | X | ◯ | ◯ |
| Heat resistance | ◯ | ◯ | ◯ | ◯ |
| Ice peeling properties | ◯ | X | ◯ | ◯ |
| Smoothness | ◯ | X | ◯ | ◯ |
| Moldability | — | ◯ | ◯ | — |
| Sound insulating performance | Δ | X | X | Δ |

The present invention has been described based on the preferred embodiment but is not restricted to the foregoing embodiment, and can be modified in many ways without departing from the scope of the present invention.

For example, in the foregoing embodiment, the description has been given as to the example which is laid on a sound source around the engine, e.g., an oil pan installed in the engine compartment of an automobile to be applied to a sound proof measure, but the present invention is not restricted thereto. The present invention can be applied to sound proof measures in various fields.

The literature described in this specification and contents of the specification of the application in Japan which forms the basis for a priority under the Paris Convention of this application are all applied herein.

LIST OF REFERENCE SIGNS 1 sound proof material
2 skin material 3 holding material
4 bonding layer
5 (5a, 5b) sound absorbing material
6 soft sound insulating material
7 lining material
8 exterior material layer
9 sound absorbing material layer

The invention claimed is:

1. A sound proof material characterized by comprising a sound absorbing material layer arranged to face a sound source and an exterior material layer laminated on the sound absorbing material layer, wherein
the exterior material layer comprises a holding material made of a woven fabric provided by weaving thermoplastic resin fibers by 2-way tricot weaving and a skin material made of a thermoplastic resin film, and is laminated on the sound absorbing material layer so that the skin material is placed on a surface side to form a rigid soundproof cover of a predetermined shape.

2. The sound proof material according to claim 1, wherein the skin material is made of a non-stretched polyamide-based resin film which is stretchable with a stretch ratio of 5 to 500%.

3. The sound proof material according to claim 1, wherein the holding material is made by weaving at least one selected from polypropylene-based resin fibers, polyester-based resin fibers, and polyamide-based resin fibers.

4. The sound proof material according to claim 1, wherein a lining material made of a thermoplastic resin film is laminated on a side of the sound proof layer facing the sound source.

5. A method for manufacturing a sound proof cover characterized in that a sound proof material according to claim 1 is hot-press-formed into a predetermined shape.

6. The method for manufacturing a sound proof cover according to claim 5, wherein a Young's modulus of the exterior material layer before the hot press forming is 0.005 to 0.5 GPa, and a Young's modulus of the exterior material layer after the hot press forming is 0.6 to 5.0 GPa.

* * * * *